United States Patent [19]
Butler et al.

[11] Patent Number: 5,562,521
[45] Date of Patent: Oct. 8, 1996

[54] TURKEY CALL

[75] Inventors: Terry L. Butler, Neosho, Mo.; Ricky J. Bishop, Warm Springs, Ga.

[73] Assignee: Lohman Manufacturing Company, Inc., Neosho, Mo.

[21] Appl. No.: 575,126

[22] Filed: Dec. 19, 1995

[51] Int. Cl.⁶ ........................................... A63H 5/00
[52] U.S. Cl. .......................................... 446/397; 446/418
[58] Field of Search ........................... 446/397, 418–422, 446/404, 408; 84/402, 410, 411

[56] References Cited

U.S. PATENT DOCUMENTS

| | | | |
|---|---|---|---|
| 785,874 | 3/1905 | Gould | 446/420 X |
| 4,586,912 | 5/1986 | Adams | 446/397 |
| 4,854,914 | 8/1989 | White, Jr. | 446/397 |
| 5,178,575 | 1/1993 | Koch | 446/397 |

*Primary Examiner*—Mickey Yu
*Attorney, Agent, or Firm*—Shook, Hardy & Bacon L.L.P.

[57] ABSTRACT

A turkey call for producing turkey sounds includes a housing having a front side with a first opening and back side with a second opening. A planar slate member is configured to be fixedly received in the second opening of the housing to form a striking surface of the turkey call. A generally dome-shaped structure is positioned within the housing in spaced relationship from the planar slate member. The dome-shaped structure has a concave surface and convex surface on opposed sides of the structure, with the concave surface facing the slate member and the convex surface facing the first opening of the housing. The dome-shaped structure and the planar slate member form a sound chamber that produces turkey sounds when the striking surface of the turkey call is placed in moving contact with a rigid member.

26 Claims, 1 Drawing Sheet

U.S. Patent          Oct. 8, 1996          5,562,521
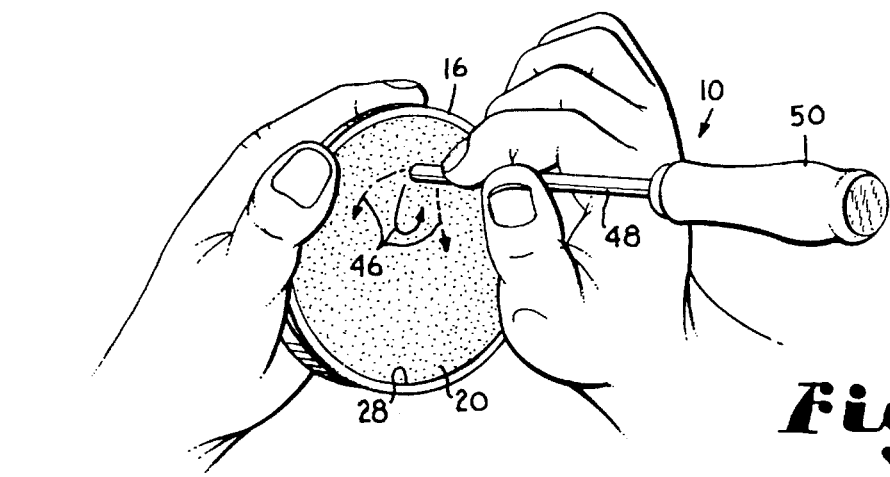

TURKEY CALL

FIELD OF THE INVENTION

The present invention relates to calls for fowl, and more particularly, to a turkey call for producing turkey sounds.

BACKGROUND OF THE INVENTION

Various types of turkey calls have been available for several years to enable hunters or competition callers to attract wild turkey. One type of turkey call available in the market is the so-called slate call. Existing slate calls typically utilize a flat slate disk encompassed by a plastic housing to serve as the call. The slate disk can be struck or hit with some sort of striking device such as a shaft of metal material. Generally, the plastic housing is completely enclosed on one side with an opening on the opposite side to receive the slate disk. The side of the plastic housing opposite the slate disk can be provided with holes to allow sound from the call to emanate. In certain calls, a series of spaced-apart holes are placed around the periphery of the housing. Other models may include a center hole in addition to or in place of the holes on the outer periphery of the call. Obviously, the goal of all turkey calls is to provide realistic and authentic sounds that will successfully attract wild turkey.

A fundamental problem with the types of turkey calls discussed above relates to the ability of these calls to produce a truly authentic turkey sound. In this regard, a significant disadvantage of existing calls is that they generally produce only a single tone or note representing the turkey sound. Obviously, the sound from a turkey includes more than a single tone or note. Thus, there is a need for a turkey call that can produce multiple tones to more authentically represent the sound of natural wild turkey.

SUMMARY OF THE INVENTION

In view of the foregoing, it is primary object of the present invention to provide a turkey call capable of producing authentic turkey sounds.

Another object of this invention is to provide a turkey call that can produce more than one tone or note of sound thereby more accurately reflecting the sound of wild turkey.

A related object of this invention is to provide a turkey call that produces enhanced sound and volume over existing turkey calls.

These and other important aims and objectives are accomplished with the turkey call according to the present invention. The turkey call includes a housing having a front side with a first opening and a back side with a second opening. A planar slate member is configured to be fixedly received in the second opening of the housing to form a striking surface for the turkey call. The turkey call also includes a generally dome-shaped structure having a concave surface and a convex surface on opposed sides of the structure. The dome-shaped structure is positioned within the housing in spaced relationship from the planar slate member such that the concave surface faces the slate member while the convex surface faces the first opening of the housing. The configuration of the dome-shaped structure in combination with the planar slate member forms a sound chamber that produces turkey sounds when the striking surface of the turkey call is placed in moving contact with a rigid member.

BRIEF DESCRIPTION OF THE DRAWINGS

The various aspects of the invention are described in detail below, with reference to the drawings, in which:

FIG. 1 is a perspective view of a turkey call embodying the principles of the present invention;

FIG. 2 is a fragmentary, detailed cross-sectional view of the turkey call of the present invention taken generally along line 2—2 of FIG. 1;

FIG. 3 is a fragmentary, exploded cross-sectional view of the region 3 shown in FIG. 2;

FIG. 4 is a perspective view of the turkey call of the present invention showing the components in a disassembled state; and FIG. 5 illustrates use of the turkey call of the present invention with arrows generally reflecting the direction of movement of a rigid shaft against the turkey call.

DETAILED DESCRIPTION OF THE PREFERRED EMBODIMENT

A turkey call for producing turkey sounds is broadly designated in the drawings by the reference numeral 10. As shown in FIG. 1, turkey call 10 includes a call portion 12 and a rigid striking shaft or striker 14. As best illustrated in FIG. 4, call portion 12 includes a housing 16, a generally dome-shaped structure or disk 18, and a planar slate disk 20. As discussed in further detail below, the arrangement of the components 16, 18 and 20 of call portion 12 in combination with striker 14 allows users to produce truly authentic turkey sounds including two or more tones or notes thereby representing a significant improvement over existing turkey calls.

Housing 16 is preferably formed of a molded plastic material. As shown in the drawings, the housing is ring-shaped and includes a first opening 22 and a second opening 24 on an opposed side of housing 16. In the illustrated embodiment, housing 16 includes an annular rim 26 on the front side of call 12 that defines the dimensions of opening 22. Housing 16 also includes a number of spaced-apart holes 27 in rim 26 to allow sound to emanate from turkey call 10.

As best illustrated in FIGS. 2 and 3, rim 26 of housing 16 is configured to receive dome-shaped disk 18 in close proximity to first opening 22. Housing 16 also includes a shoulder 28 in close proximity to the second opening 24 to serve as a support for the outer periphery of slate disk 20 thereby allowing slate disk 20 to be fixedly received in the second opening 24 of housing 16. In the illustrated embodiment, shoulder 28 comprises a raised rib or flange that has a slightly larger circumference than the remaining portion of housing 16.

In accordance with an important aspect of the present invention, turkey call 10 provides dome-shaped disk 18 to enhance the sound and volume of the turkey call. As best shown in FIG. 2, dome-shaped disk 18 includes a concave surface 30 and a convex surface 32 on opposed sides of dome-shaped disk 18. Dome-shaped disk 18 is positioned within housing 16 in a spaced relationship from slate disk 20. As can be seen, concave surface 30 of dome-shaped disk 18 faces slate disk 20 while convex surface 32 faces the first opening 22 of housing 16. In accordance with the invention, the configuration and relative positioning of dome-shaped disk 18 in conjunction with slate disk 20 forms a sound chamber 34 capable of producing two or more tones or notes of turkey sound when striker 14 is moved against slate disk 20 of call portion 12. Thus, the configuration of dome-shaped disk 18 in effect produces an echo chamber that changes the pitch of the sound emanating from turkey call 10 when striker 14 moves against slate disk 20.

Dome-shaped disk 18 further includes an annular ring 36 which defines a circular wall emanating from and surrounding the convex surface 32 of disk 18 as can be seen in FIG. 3 and FIG. 4. The annular ring 36 is integrally formed with the dome-shaped portion of disk 18 and emanates from a curved location 38 at the base of the concave/convex surfaces. Annular ring 36 terminates in a flanged surface 40 configured to be placed in fixed relation with rim 26 of housing 16. More particularly, rim 26 includes a groove 42 in its inner perimeter for fixed attachment of dome-shaped disk 18. Preferably, disk 18 is insert molded into the rim 26 of housing 16 at the time of manufacture. As shown in the illustrated embodiment, the flange surface 40 of disk 18 includes a series of spaced apart holes 44. These holes can be supplied to provide greater fixation during the molding process since the plastic material will flow through the holes and surround the flanged surface 40 of disk 18.

In the preferred embodiment, disk 18 is formed of a metal material, preferably aluminum material. However, the dome-shaped disk could be formed of brass, other metals, or even plastic. Although the dimensions of the call portion 12 can vary, it has been determined that certain dimensions provide a better and more authentic turkey sound. For example, the thickness of the aluminum material should be on the order of 0.01 inch. The radius of curvature of the convex/concave surfaces of the dome-shaped portion of disk 18 should be about 1.75 radians for a dome having an overall diameter of about 2.0625 inches. Additionally, in the disclosed embodiment, the thickness of the slate disk is about 0.11 inches with a diameter of approximately 3.35 inches.

Referring now to FIG. 5, it can be seen that a user presses striker 14 against slate disk 20 of call portion 12 to produce turkey calls. Arrows 46 illustrate that a user can produce different types of turkey sounds including a purr, a yelp, and a putt. In the preferred embodiment, striker 14 includes a striker shaft 48 preferably formed of carbon fiber material. The carbon striker shaft 48 is attached to a wooden handle 50 as shown in FIGS. 1 and 5.

As is evident from the foregoing description, the present invention provides a turkey call capable of producing truly authentic turkey sounds with an improved sound and volume over prior turkey calls. The turkey call of the present invention includes a dome-shaped disk that provides a sound or echo chamber to produce high quality turkey sounds. With this configuration, the turkey call of the present invention is capable of producing turkey sounds having two or more tones or pitches for even greater authenticity.

While this invention has been described with an emphasis upon a preferred embodiment, it will be understood by those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

We claim:

1. A turkey call for producing turkey sounds comprising:
   a housing having a front side with a first opening and a back side with a second opening;
   a planar slate member configured to be fixedly received in the second opening of the housing to form a striking surface of the turkey call; and
   a generally dome-shaped structure having a concave surface and a convex surface on opposed sides of said structure, the generally dome-shaped structure being positioned within the housing in spaced relationship from the planar slate member with the concave surface facing the slate member and the convex surface facing the first opening of the housing, wherein the dome-shaped structure and the planar slate member form a sound chamber that produces turkey sounds when the striking surface of the turkey call is placed in moving contact with a rigid member.

2. The turkey call as defined in claim 1 wherein the housing is ring-shaped.

3. The turkey call as defined in claim 1 wherein the housing includes a shoulder in close proximity to the second opening, the shoulder serving as a support for the outer periphery of the planar slate member to fixedly receive the planar slate member in the second opening.

4. The turkey call as defined in claim 1 wherein the housing is formed of plastic material.

5. The turkey call as defined in claim 1 wherein the planar slate member comprises a generally circular slate disk.

6. The turkey call as defined in claim 1 wherein the generally dome-shaped structure is formed of a metal material.

7. The turkey call as defined in claim 6 wherein the metal material is aluminum.

8. The turkey call as defined in claim 1 wherein the generally dome-shaped structure is disk-shaped.

9. The turkey call as defined in claim 1 wherein the generally dome-shaped structure includes an annular ring integral with and surrounding said dome-shaped structure.

10. The turkey call as defined in claim 9 wherein the annular ring of the generally dome-shaped structure terminates in a flanged surface surrounding the periphery of the annular ring.

11. The turkey call as defined in claim 10 wherein the front side of the housing includes a rim surface, and wherein the rim surface defines the first opening in the housing that is smaller in dimension than the second opening in the housing.

12. The turkey call as defined in claim 11 wherein the flanged surface of the dome-shaped structure is positioned in fixed relationship to the rim surface of the housing.

13. The turkey call as defined in claim 1 wherein the generally dome-shaped structure is insert molded into the housing in close proximity to the first opening.

14. The turkey call as defined in claim 1 further comprising a rigid striking shaft for movement against the striking surface of the turkey call to produce turkey sounds.

15. The turkey call as defined in claim 14 wherein the rigid striking shaft comprises a carbon fiber material.

16. A turkey call for producing turkey sounds comprising:
   a housing having a front side and a back side, the front side having a rim surface defining a first opening in the housing that is smaller in dimension than a second opening in the back side of the housing;
   a planar slate member configured to be fixedly received in the second opening of the housing to form a striking surface of the turkey call; and
   a generally dome-shaped structure positioned within the housing and interposed between the planar slate member and the rim surface of the first opening, wherein the region defined by the dome-shaped structure and the planar slate member forms a sound chamber that produces turkey sounds when the striking surface of the turkey call is struck with a rigid striking member.

17. The turkey call as defined in claim 16 wherein the housing is ring-shaped.

18. The turkey call as defined in claim 16 wherein the housing includes a shoulder in close proximity to the second opening, the shoulder serving as a support for the outer periphery of the planar slate member to fixedly receive the planar slate member in the second opening.

19. The turkey call as defined in claim 16 wherein the planar slate member comprises a generally circular slate disk.

20. The turkey call as defined in claim 16 wherein the generally dome-shaped structure is formed of a metal material.

21. The turkey call as defined in claim 16 wherein the generally dome-shaped structure is insert molded into the housing in close proximity to the first opening.

22. A turkey call for producing turkey sounds comprising:
   a ring-shaped housing having a front side and a back side, the front side having an annular rim defining a first opening that is smaller in diameter than a second opening in the back side of the housing;
   a slate disk member configured to be fixedly received in the second opening of the housing to form a striking surface; and
   a generally dome-shaped disk formed of a metal material disposed within the housing between the annular rim of the housing and the slate disk member, the dome-shaped disk and the slate disk member forming a sound chamber that produces turkey sounds when a rigid member is moved against the slate disk.

23. The turkey call as defined in claim 22 wherein the housing includes a shoulder in close proximity to the second opening, the shoulder serving as a support for the outer periphery of the slate disk member to fixedly receive the slate disk member in the second opening.

24. The turkey call as defined in claim 22 wherein the metal material is aluminum.

25. The turkey call as defined in claim 22 wherein the generally dome-shaped disk includes an annular ring integral with and surrounding said dome-shaped disk, the annular ring terminating in a flanged surface surrounding the periphery of the annular ring.

26. The turkey call as defined in claim 22 wherein the generally dome-shaped disk is insert molded into the housing in close proximity to the first opening.

* * * * *